United States Patent [19]
Courturier

[11] Patent Number: 5,269,568
[45] Date of Patent: Dec. 14, 1993

[54] SECURITY SEAL APPARATUS

[75] Inventor: Michael G. Courturier, Little Compton, R.I.

[73] Assignee: Product Solutions, Tiverton, R.I.

[21] Appl. No.: 886,132

[22] Filed: May 20, 1992

[51] Int. Cl.⁵ ............................................... F16L 35/00
[52] U.S. Cl. ..................................... 285/80; 285/419; 285/423; 285/421
[58] Field of Search ................... 285/45, 80, 373, 419, 285/15, 421, 423

[56] References Cited

U.S. PATENT DOCUMENTS

| | | | |
|---|---|---|---|
| 809,327 | 1/1906 | Rieske | 285/373 X |
| 3,009,483 | 11/1961 | Salustri | 285/419 X |
| 3,982,779 | 9/1976 | Hickey | 285/373 X |
| 4,372,593 | 2/1983 | Kesselman | 292/307 B |
| 4,405,161 | 9/1983 | Young et al. | 285/80 |
| 4,541,256 | 9/1985 | Green | 285/45 X |
| 4,600,220 | 7/1986 | Agnelli | 285/80 |
| 4,607,866 | 8/1986 | Erlichman | 285/45 |
| 4,826,215 | 5/1989 | Sullivan | 285/80 |
| 5,092,631 | 3/1992 | Masnik et al. | 285/14 |

Primary Examiner—Dave W. Arola
Attorney, Agent, or Firm—Barlow & Barlow, Ltd.

[57] ABSTRACT

A security seal device is shown formed of plastic material generally in the shape of two hollow half cylinders connected together by a longitudinally extending living hinge and having apertured end faces. Spaced, opposed lips are formed in laterally extending shelves attached to each half and a locking pin is received between the lips and projections formed in the pin received in detents formed in the lips to lock the two halves together. The device is used by placing a joint formed between first and second members within one of the halves with the first and second members placed through respective end face apertures. The other half is then pivoted to close the cylinder and the locking pin is inserted. The device can then be reopened only through physical damage by breaking the seal.

10 Claims, 2 Drawing Sheets

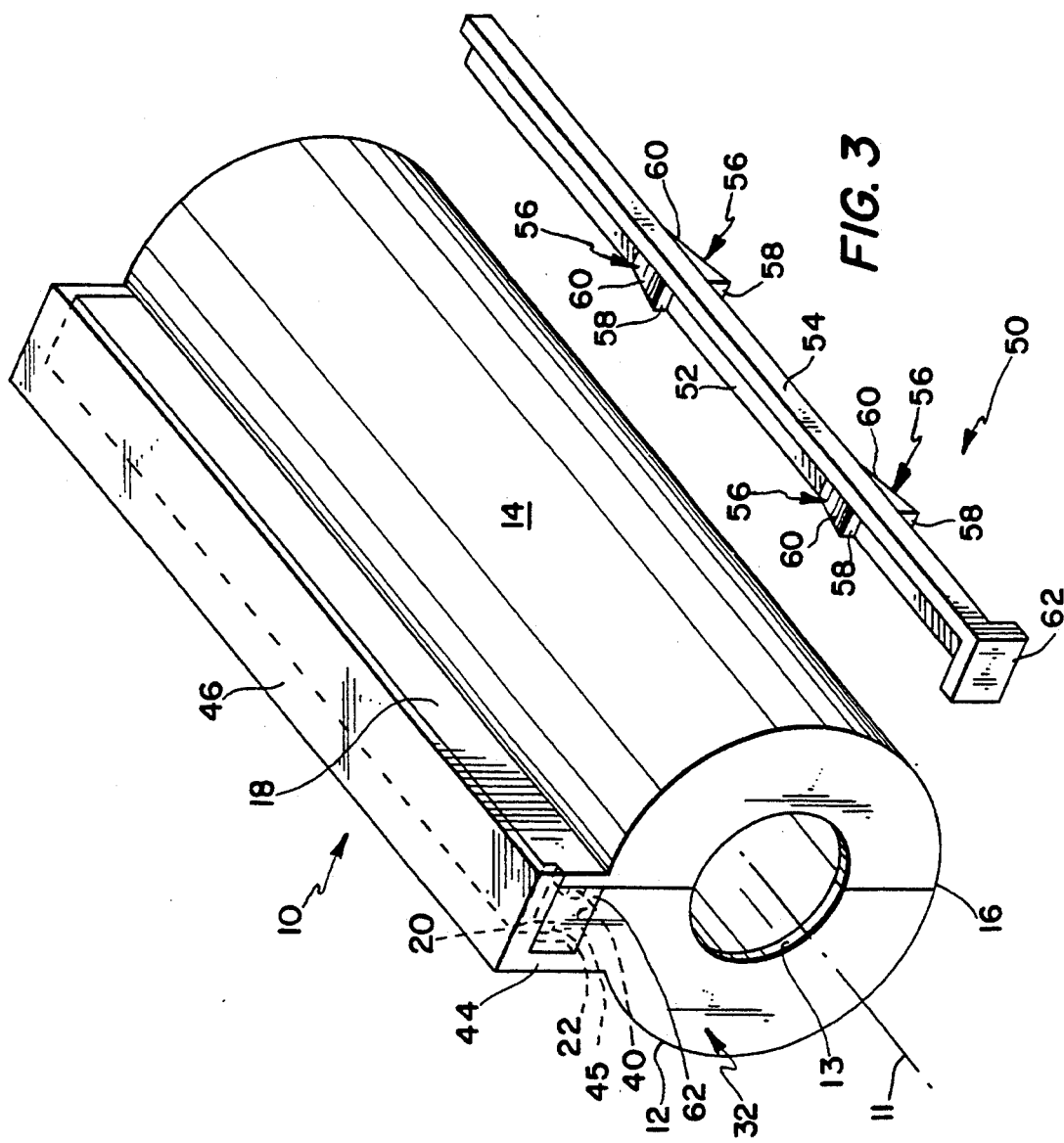

SECURITY SEAL APPARATUS

BACKGROUND OF THE INVENTION

This invention relates generally to security apparatus and more specifically to a device for preventing access to an interconnection joint between two members without breaking a seal thereby providing an indication of the integrity of the seal.

There are many industries in which it is desired to prevent tampering with interconnection joints. For example, tampering with well head distribution valving, gas meter coupling nuts, gas line fittings, hose and pipe connections and electrical wiring and communication connections to name but a few.

Conventional apparatus to provide such security have included various interfitting lockable structures such as a two-part housing hinged together to enclose an interconnection joint and fastened together using a conventional lock or wire seal such as shown in U.S. Pat. Nos. 3,009,483; 4,826,215 and 5,092,631. Other devices have included two plastic halves that join together to form a permanent enclosure of a joint or coupling which requires destruction of the structure to obtain access to the joint or coupling. Examples of these devices are shown in U.S. Pat. Nos. 4,405,161; 4,600,200 and 4,372,593. These devices, generally have been effective in serving their intended function; however, the configuration of the locking members have been relatively complex and expensive to produce.

It is an object of the present invention to provide a simple device which is adapted to sealingly enclose an interconnection joint which can only be removed by breaking the seal.

Another object is the provision of such a device which is easily installed, reliable and yet of low cost.

These, together with other objects and advantages which will become subsequently apparent, reside in the details of construction and operation as more fully described and claimed, reference being made to the accompanying drawings which form a part thereof wherein the reference numerals refer to like parts throughout.

Briefly, in accordance with the invention, first and second generally hollow cylindrical halves of a hard plastic material are joined together by a living hinge. The halves are pivotable to form an enclosure and are provided with apertures in each end face to accommodate reception of an interconnection joint or coupling of first and second members within the enclosure with the members extending out through respective apertures. One half is formed with a lip means extending outwardly and the other half is formed with lip means extending inwardly with the two lip means adapted to pass beyond one another in spaced facing relation when the halves are closed. A locking pin is then received in a channel forming the space between the two lip means. A plurality of detents are formed on the lip means or the locking pin which are adapted to lockingly engage with a corresponding plurality of projections formed in the other of the lip means and the locking pin.

According to a feature of the invention, the detents and projections each are formed with a surface which lies in a plane perpendicular to the longitudinal axis of the cylinder and a second inclined surface which enables the pin to be inserted between the two lip means at one end of the channel wedging them apart until the projections are received within the detents with the surfaces perpendicular to the longitudinal axis preventing outward movement of the pin. The opposite end of the channel is closed by a wall to prevent access from that end thereby preventing removal of the pin without fracturing the housing.

BRIEF DESCRIPTION OF THE DRAWINGS

FIG. 2 is a perspective view of the FIG. 1 housing shown in the closed but locked position; and FIG. 3 is a perspective view of a locking pin which, when inserted in the housing, seals the device.

DETAILED DESCRIPTION OF THE INVENTION

Figure 1:
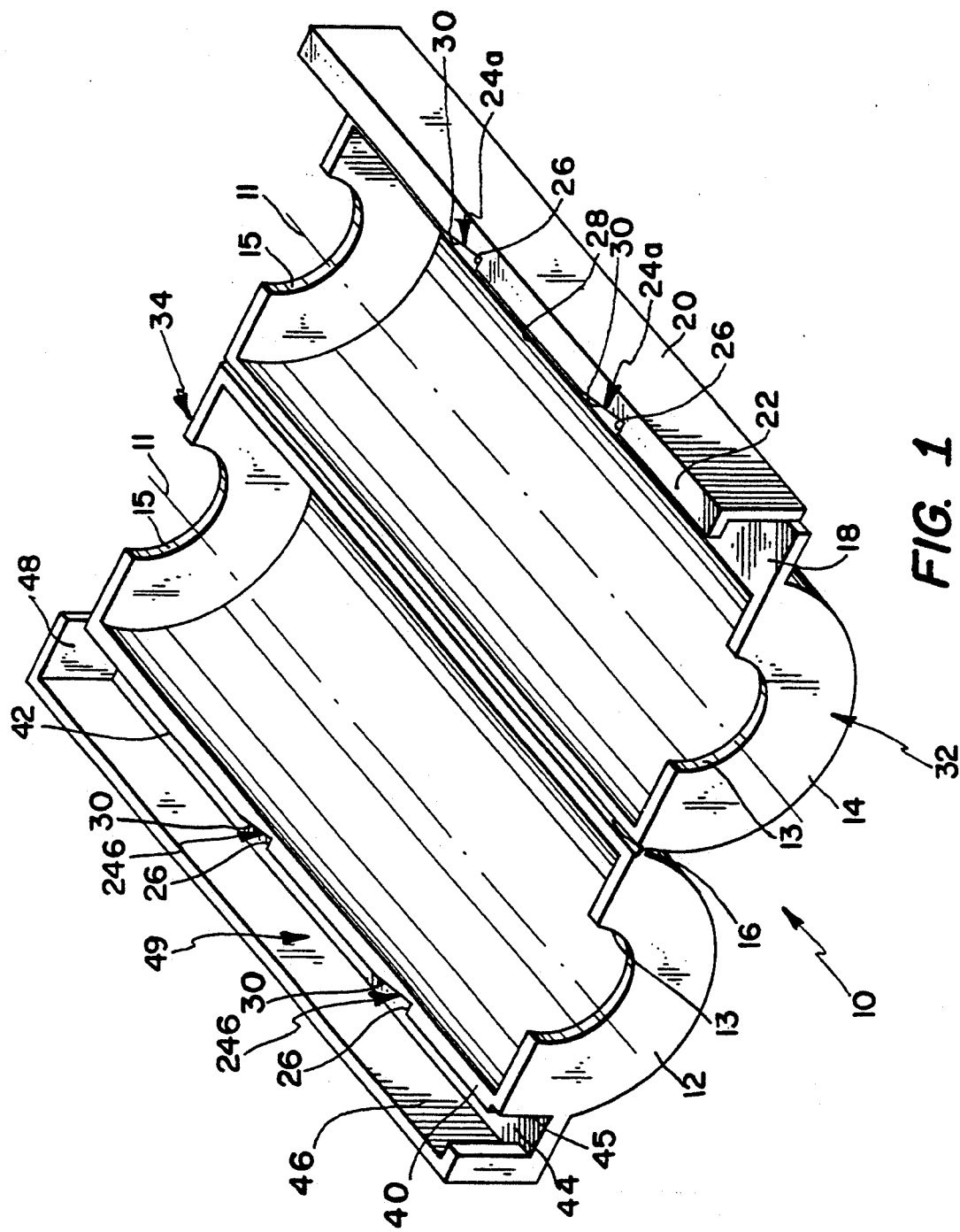
FIG. 1 is a perspective view of the security seal housing made in accordance with the invention shown in its open position.

As seen in FIGS. 1 and 2, an elongated, generally cylindrical member 10 has a longitudinal axis 11 and first and second halves 12 and 14 join together by a longitudinal, integral hinge portion 16. A first aperture 13 is formed in a first end face 32 of halves 12 and 14 and a second aperture 15 is formed in a second end face 34 of halves 12 and 14 for reception of members on either side of a joint for interconnection of two members to be secured. Half 14 has a first wall 18 extending outwardly from a free outer longitudinal portion of the half and lying in the plane which is generally parallel to one in which the longitudinal axis 11 of member 10 and hinge portion 16 lie. Wall 18 has a laterally extending shelf 20 from which, in turn, extends inwardly extending lip 22. A plurality of saw tooth detents 24a are formed in a distal free end 28 of lip 22 having a first surface 26 lying in a plane generally perpendicular to the longitudinal axis 11 and an inclined surface portion 30 extending back to the free end.

Half 12 has an outwardly extending lip 40 in which are formed in the free distal end 42 a plurality of saw tooth detents 24b having surfaces 26 and 30 corresponding to detents 24a. An outwardly extending wall 44 extends from a laterally extending shelf 45 and half 12 and, in turn, has a laterally extending skirt 46, along with first wall 18 and shelf 20. Walls 45, 44 and 46 form a longitudinally-extending channel 49 which has an end at face 34 closed by end wall 48 extending between walls 45 and 46. The length of outwardly extending wall 44 is sufficient to receive shelf 20 and lip 22 when the two halves are brought together as shown in FIG. 2.

Member 10, when used as a security seal for an interconnection joint between first and second members has one member placed through aperture 13 and one half of end face 32 and the other member placed through aperture 15 in the other end face 34 of the half with a joint disposed between the two end faces. The other half of the member is then pivoted about hinge 16 so that lip 22 is received within channel 49 closely adjacent outwardly extending wall 44, as seen in FIG. 2. The material used to form member 10 is chosen so that it is hard and frangible but sufficiently flexible to pivot about hinge 16, such as polypropylene.

A locking pin 50, as shown in FIG. 3, is then inserted between the distal free end 28 of lip 22 and laterally extending shelf 45. Pin 50 is formed with first and second off-set longitudinal bar portions 52, 54 respectively, with a plurality of projections 56 spaced on opposite sides of pin 50 on the lower surface portions of the bar portions. Each projection has a first surface 58 lying in a plane generally perpendicular to the longitudinal axis of body portion 54 and a second incline surface portion 60 extending from an outer edge of surface 58 to body portion 54. A projection 52 is provided for each detent 24a, 24b, the projections being spaced apart the same distance as the detents. The cross section of the locking pin body portion 54 generally conforms to the space between lip 22 and shelf 45 and between lip 40 and shelf 20 so that the in can be inserted into the channel with inclined surfaces 60 wedging shelf 20 outwardly sufficiently to allow the pin to be forced inwardly until projections 56 are snapped into detents 24a, 24b with surfaces 26 and 58 contiguous with one another in a locking relationship. It will be noted that pin 50 can be rotated 180° and still perform its locking function while wall 48 precludes entry of any object from the opposite direction which might otherwise pry the respective inclined surfaces of the projections out of detents.

Pin 50 is preferably provided with a head 62 to facilitate insertion of the pin into the channel 49, the head being received in and essentially closing the opening to the channel.

Although the above embodiment has been specifically disclosed with the projections formed on the locking pin and the detents on the lips, it is within the purview of the invention to place the projections on the lips and the detents in the locking pin. It is also within the purview of the invention to add suitable gaskets, if desired, at apertures 13, 15 to provide a close fit with the first and second members to be received therethrough.

A device made in accordance with the invention for F-style cable interconnection joints has a length of 211, an outside diameter of 7/8" and apertures 13 and 15 of 3/8" and ¼", respectively.

It is to be understood that the specific embodiment of the invention which has been described is merely illustrative and that various modifications may be made by those skilled in the art without departing from the scope of the invention as defined by the following claims.

I claim:

1. Joint security apparatus comprising a generally cylindrical member formed of hard plastic material having a longitudinal axis and first and second halves formed along an imaginary plane in which the longitudinal axis lies and having one half integrally attached to the other half by a hinge formed of a relatively thin portion extending parallel to the longitudinal axis, the first and second halves having a free outer longitudinally extending portion, a first wall extending in a direction parallel to the plane and outwardly from the free outer portion of the first half, a first lateral shelf extending from the first wall, a first lip formed on the shelf extending toward the first half, the first lip having a free distal end, and second lateral shelf formed on the free outer portion of the second half and a second lip having a free distal end formed on the second shelf extending away from the second half adjacent the free outer portion of the second half, a second wall extending outwardly from the second lateral shelf the second wall being disposed beyond the second lip relative to the free outer portion of the second half, detent means formed in at least one of the free distal ends, the first and second halves having opposite end faces formed with an aperture in each face adapted to closely receive a member extending from a joint with a joint disposed between the end faces, the first and second halves adapted to pivot together to enclose the joint with the first lateral shelf and the first lip received over the second lateral shelf and the second lip and with the first lip disposed intermediate the second lip and the second wall and, a locking pin having projection means adapted to be received in a channel formed between the first and second lateral shelves with the projection means received in the detent means locking the first and second halves together.

2. A joint security apparatus according to claim 1 further including a skirt extending from the second wall and adapted to be disposed over the first lateral shelf.

3. A joint security apparatus according to claim 1 in which the channel has first and second ends and an end wall is formed closing the second end of the channel.

4. A joint security apparatus according to claim 3 in which detent means is formed in the free distal end of the first and second lips.

5. A joint security apparatus according to claim 3 in which the detent means comprises a plurality of recesses, each formed of recess surfaces having a first surface portion closest to the first end which lies in a plane generally perpendicular to the longitudinal axis and the projections on the locking pin each having a surface portion which lies in a plane generally perpendicular to the longitudinal axis and adapted to interlock with the first surface portion of a respective recess.

6. A joint security apparatus according to claim 5 in which each projection of the locking pin is formed with an inclined surface portion adapted to wedge the first lip upwardly as the pin is inserted into the channel until the projections are received in the recesses.

7. A joint security apparatus according to claim 6 in which the locking pin is formed with a head portion to facilitate insertion of the pin into the recess.

8. A joint security apparatus according to claim 1 in which the channel has first and second ends and an end wall is formed closing the second wall of the channel.

9. A joint security apparatus comprising a generally cylindrical member formed of hard plastic material having a longitudinal axis and first and second halves having one half integrally attached to the other half by a hinge formed of a relatively thin portion extending parallel to the longitudinal axis, the first and second halves having a free outer longitudinal portion, a first wall extending outwardly from the free outer portion of the first half, a first lateral shelf extending from the first wall, a first lip formed on the shelf extending toward the first half, a second lateral shelf formed on the free outer portion of the second half and a second lip formed on the second lateral shelf extending away from the second half adjacent the free outer portion of the second half, a second wall extending outwardly from the second lateral shelf, the second wall being disposed beyond the second lip relative to the free outer portion of the second half the first and second halves having opposite end faces formed with an aperture in each face adapted to closely receive a member extending form a joint with the joint disposed between the end faces, the first ad second halves adapted to pivot together to enclose the joint with the first lateral shelf and the first lip received over the second laterla shelf and the second lip, and a locking pin adapted to be receiving a channel formed between the first and second laterla shelves, detent means formed in one of the first and second lips and the locking pin and projection means formed in the other of the first and second lips and the locking pin, the projection means adapted to be received int h detent means when the locking pin is inserted in the channel to locking the first and second hales together.

10. A joint security apparatus according to claim 9 further including a skirt extending from the second wall and adapted to be disposed over the first laterla shelf.

* * * * *